(12) United States Patent
Jessie

(10) Patent No.: US 11,026,532 B2
(45) Date of Patent: Jun. 8, 2021

(54) METHOD FOR OPERATING A TEMPERATURE CONTROLLED DELIVERY BOX

(71) Applicant: Haier US Appliance Solutions, Inc., Wilmington, DE (US)

(72) Inventor: Jeffrey Lynn Jessie, Taylorsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 143 days.

(21) Appl. No.: 16/171,545

(22) Filed: Oct. 26, 2018

(65) Prior Publication Data
US 2020/0128991 A1    Apr. 30, 2020

(51) Int. Cl.
*A47G 29/14* (2006.01)
*G06Q 10/08* (2012.01)
*G05D 23/19* (2006.01)

(52) U.S. Cl.
CPC .......... *A47G 29/141* (2013.01); *A47G 29/14* (2013.01); *G06Q 10/0832* (2013.01); *A47G 2029/144* (2013.01); *A47G 2029/145* (2013.01); *A47G 2029/146* (2013.01); *A47G 2029/147* (2013.01); *A47G 2029/149* (2013.01); *G05D 23/1917* (2013.01)

(58) Field of Classification Search
CPC ...... A47G 29/141; A47G 29/14; A47G 29/16; A47G 2029/144–149; G06Q 10/0832; G05D 23/1917; F25D 11/02
USPC .............. 232/17, 19, 24–25, 34–36, 44, 45; 340/568.1, 569; 705/332; 312/404
See application file for complete search history.

(56) References Cited

U.S. PATENT DOCUMENTS

| | | | | |
|---|---|---|---|---|
| 5,774,053 | A * | 6/1998 | Porter | G07F 17/12 340/568.1 |
| 6,426,699 | B1 * | 7/2002 | Porter | A47F 10/00 221/2 |
| 7,653,603 | B1 | 1/2010 | Holtkamp, Jr. | |
| 10,039,401 | B1 * | 8/2018 | Romanucci | A47C 7/628 |
| 2012/0158606 | A1 * | 6/2012 | Moudy | G06Q 10/0832 705/332 |
| 2015/0102903 | A1 * | 4/2015 | Wilkinson | A47G 29/141 340/5.61 |
| 2016/0025365 | A1 * | 1/2016 | Moudy | G05B 15/02 700/276 |
| 2016/0058181 | A1 | 3/2016 | Han | |
| 2016/0371642 | A1 | 12/2016 | Wilkinson | |
| 2017/0007058 | A1 * | 1/2017 | Nuckols | A47G 29/14 |
| 2017/0286905 | A1 | 10/2017 | Richardson et al. | |
| 2018/0070753 | A1 * | 3/2018 | Eveloff | A47G 29/141 |
| 2018/0177319 | A1 * | 6/2018 | Willis | A47G 29/141 |

(Continued)

*Primary Examiner* — William L Miller
(74) *Attorney, Agent, or Firm* — Dority & Manning, P.A.

(57) ABSTRACT

A temperature controlled delivery appliance and a method of operating the same are provided. The temperature controlled delivery appliance includes a storage container, a climate control system for regulating the temperature within the storage container, and a controller for implementing a preconditioning method, which includes maintaining the storage container at a preconditioning temperature until a delivery notification is received, and operating the climate control system to regulate the container temperature to a target temperature upon receiving the delivery notification.

10 Claims, 8 Drawing Sheets

(56) References Cited

U.S. PATENT DOCUMENTS

| | | | | |
|---|---|---|---|---|
| 2019/0043298 A1* | 2/2019 | Moudy | ............. | G07C 9/00857 |
| 2019/0130348 A1* | 5/2019 | Mellado | ............. | G07C 9/00912 |
| 2019/0266819 A1* | 8/2019 | McHale | ............... | A47G 29/141 |
| 2020/0077826 A1* | 3/2020 | Chenier | ............. | G07C 9/00912 |
| 2020/0128991 A1* | 4/2020 | Jessie | ................... | A47G 29/141 |

* cited by examiner

METHOD FOR OPERATING A TEMPERATURE CONTROLLED DELIVERY BOX

FIELD OF THE INVENTION

The present subject matter relates generally to temperature controlled delivery boxes, and more particularly, to methods for operating temperature controlled delivery boxes.

BACKGROUND OF THE INVENTION

Given the rise in food and grocery delivery services, temperature controlled and access secure delivery appliances are desirable to permit deliveries when the consumer is not home. For example, delivery appliances are typically positioned outdoors of a residence and have a climate control system for regulating the temperature within a storage container positioned within a cabinet of the delivery appliance. In this manner, the consumer may receive delivery of food orders and maintain that food at the desired storage temperature, even while not at home. For example, the user or the delivery service may set a temperature of the delivery appliance at a desired temperature to avoid spoiling perishable food items or to otherwise prevent degradation of the quality of the food which might otherwise occur if the food were stored in an uncontrolled environment.

Notably, consistently maintaining the delivery appliance at the desired temperatures can expend large amounts of energy and result in additional wear on the heating and cooling components. For example, it may be difficult or costly to maintain the storage container at refrigerator temperatures (e.g., approximately 37° F.) or at freezer temperatures (e.g., approximately 0° F.) regardless of the outside temperature. Therefore, it may be desirable to heat or cool the storage container to the desired temperature only when food is expected for delivery. However, it is often inefficient to quickly heat or cool an unregulated container to a significantly different desired temperature. In addition, the heating or cooling systems may be incapable of regulating the temperature as quickly as needed, particularly if there is a large difference between the actual and target temperature.

Accordingly, a temperature controlled delivery box and methods of controlling the same for improved operation would be desirable. More specifically, a method for regulating the temperature of a delivery box quickly, efficiently, and without significant appliance degradation would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a method for pre-conditioning a temperature controlled delivery appliance is provided. The temperature controlled delivery appliance includes a storage container and a climate control system. The method includes maintaining the storage container at a preconditioning temperature, receiving a delivery notification, obtaining a target temperature, and operating the climate control system to regulate a container temperature to the target temperature.

In another exemplary embodiment, a temperature controlled delivery appliance is provided, including a cabinet, a storage container positioned within the cabinet for receiving delivered items for storage, and a climate control system in thermal communication with the storage container for regulating a temperature of the storage container. A controller is operably coupled to the climate control system for maintaining the storage container at a preconditioning temperature, receiving a delivery notification, obtaining a target temperature, and operating the climate control system to regulate a container temperature to the target temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
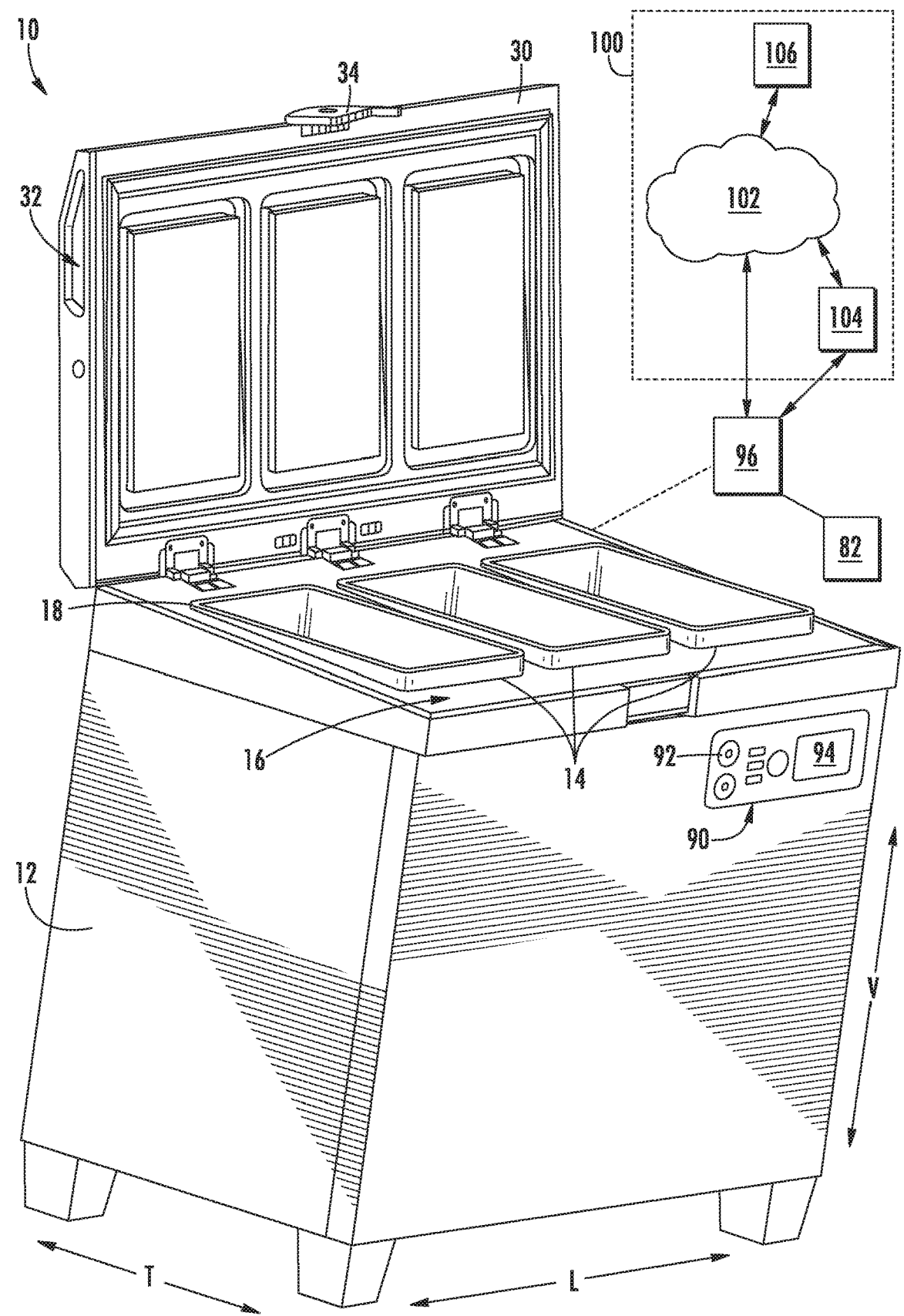
FIG. 1 is a front perspective view of a temperature controlled delivery box according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 through 4 depict a temperature controlled delivery appliance 10 that is generally configured for receiving delivery of food items or other articles that are preferably stored in a temperature controlled environment. According to exemplary embodiments, temperature controlled delivery appliance 10 is positioned outside a consumer's residence and is configured for receiving grocery or other food deliveries. It should be appreciated that the term "temperature controlled delivery appliance," or simply "delivery appliance," is used in a generic sense herein to encompass any device intended for storing items in a refrigerated, heated, or other climate controlled environment. In addition, it should be understood that the present subject matter is not limited to use in delivery appliances. Thus, the present subject matter may be used for any other suitable purpose, such as for receiving any other product or item that is desirably maintained in a temperature controlled environment.

In the illustrated example embodiment shown in FIG. 1, the temperature controlled delivery appliance 10 includes a casing or cabinet 12 that extends between a top and a bottom along a vertical direction V, between a first side and a second side along a lateral direction L, and between a front side and a rear side along a transverse direction T. Each of the vertical direction V, lateral direction L, and transverse direction T are mutually perpendicular to one another, such that an orthogonal coordinate system is generally defined.

As illustrated delivery appliance 10 includes one or more storage containers 14 mounted within cabinet 12. Specifically, according to the illustrated embodiment, delivery appliance 10 includes three storage containers 14 mounted in or suspended from a top panel 16 of cabinet 12, e.g., using any suitable support brackets, mechanical fasteners, welding, snap-fit mechanisms, etc. In addition, it should be appreciated that an insulating material (not shown), such as foam panels, fiberglass, or spray-in foam insulation, may be positioned within cabinet 12 around storage containers 14 to provide thermal and/or sound insulation to delivery appliance 10.

As illustrated, each of the three storage containers 14 define an opening 18 at top panel 16 of cabinet 12. In this regard, food items 20 (FIG. 3) or other temperature controlled products may be positioned within storage containers 14 for temperature controlled storage, e.g., until they may be moved to a refrigerator appliance or pantry when the consumer returns home. As explained in detail below, each storage container 14 may be maintained at a different temperature for receiving foods that have different desired storage temperatures. For example, as illustrated in FIG. 3, storage containers 14 may have target temperatures suitable for storing room temperature food items 20 (such as bread, cereal, etc.), refrigerator food items (e.g., fruits, vegetables, milk, etc.), and frozen food items 20 (e.g., frozen pizza, ice cream, etc.).

Although the figures illustrate delivery appliance 10 as including three storage containers 14 having substantially rectangular cross sections and being spaced apart along the lateral direction L, it should be appreciated that the illustrated embodiment is used only as an example. According to alternative embodiments, delivery appliance 10 may include any suitable number of storage containers 14 having any suitable shape, size, and configuration. In addition, aspects of the present subject matter may apply to conventional refrigerator appliance with doors pivotally mounted to a front of the appliance. Such embodiments are contemplated as within the scope of the present subject matter.

Delivery appliance 10 further includes a door 30 rotatably attached to cabinet 12 in order to permit selective access to storage containers 14. Specifically, as illustrated, door 30 is pivotally mounted to a back of cabinet 12 and is positioned over openings 18 in the closed position. A handle 32 is mounted to or defined in door 30 to assist a user with opening and closing door 30 and a latch assembly 34 is mounted to cabinet 12 and/or door 30 for selectively locking door 30 in the closed position. Latch assembly 34 may be desirable, for example, to ensure only secured access (e.g., via the consumer or delivery person) and to prevent tampering or theft after food items 20 are delivered.

Figure 2:
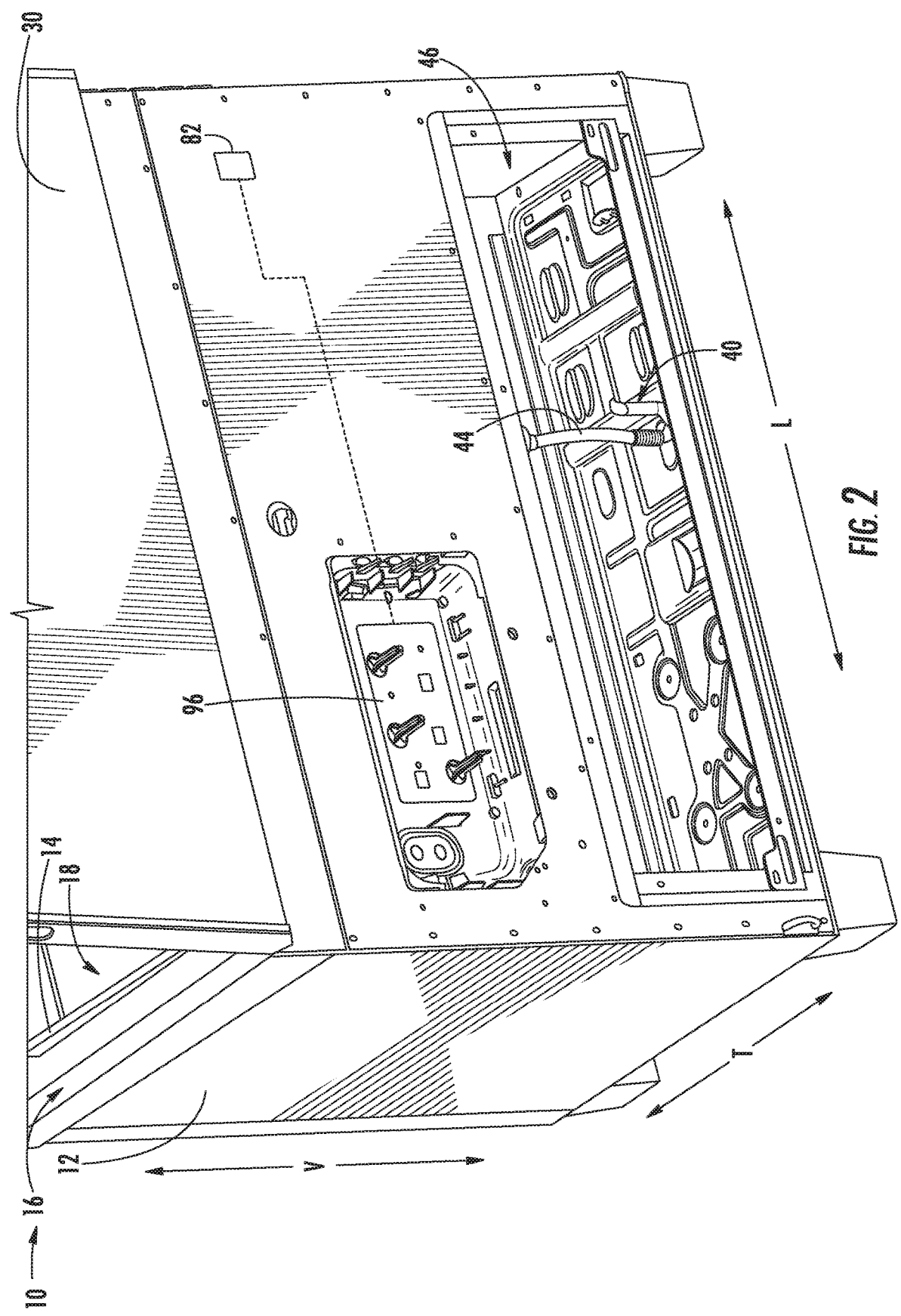
FIG. 2 is a rear perspective view of the exemplary temperature controlled delivery box of FIG. 1, with a back cover removed to reveal a controls compartment and a mechanical compartment.
Figure 3:
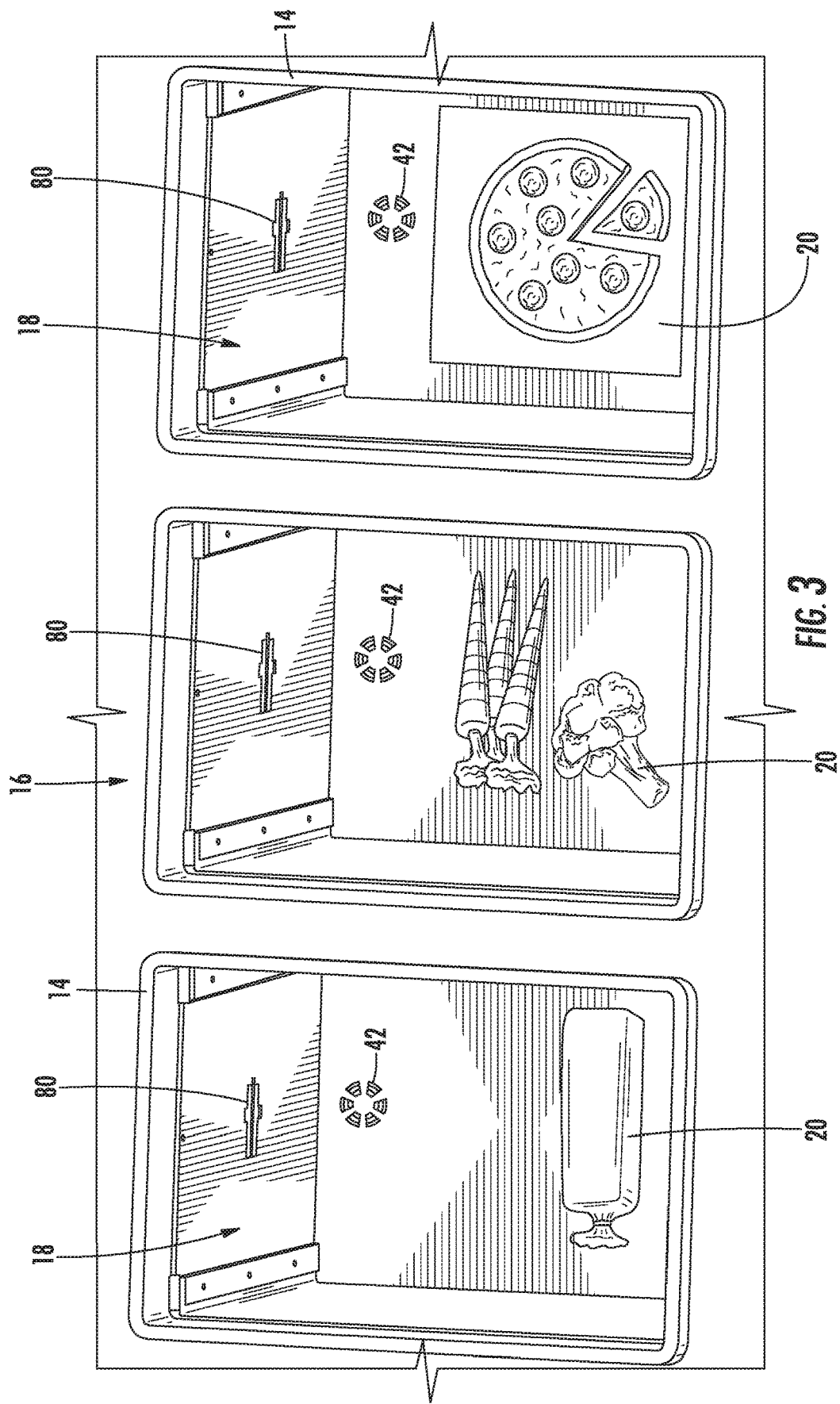
FIG. 3 provides a top view of storage containers positioned within the exemplary temperature controlled delivery box of FIG. 1 according to an exemplary embodiment of the present subject matter.
Figure 4:
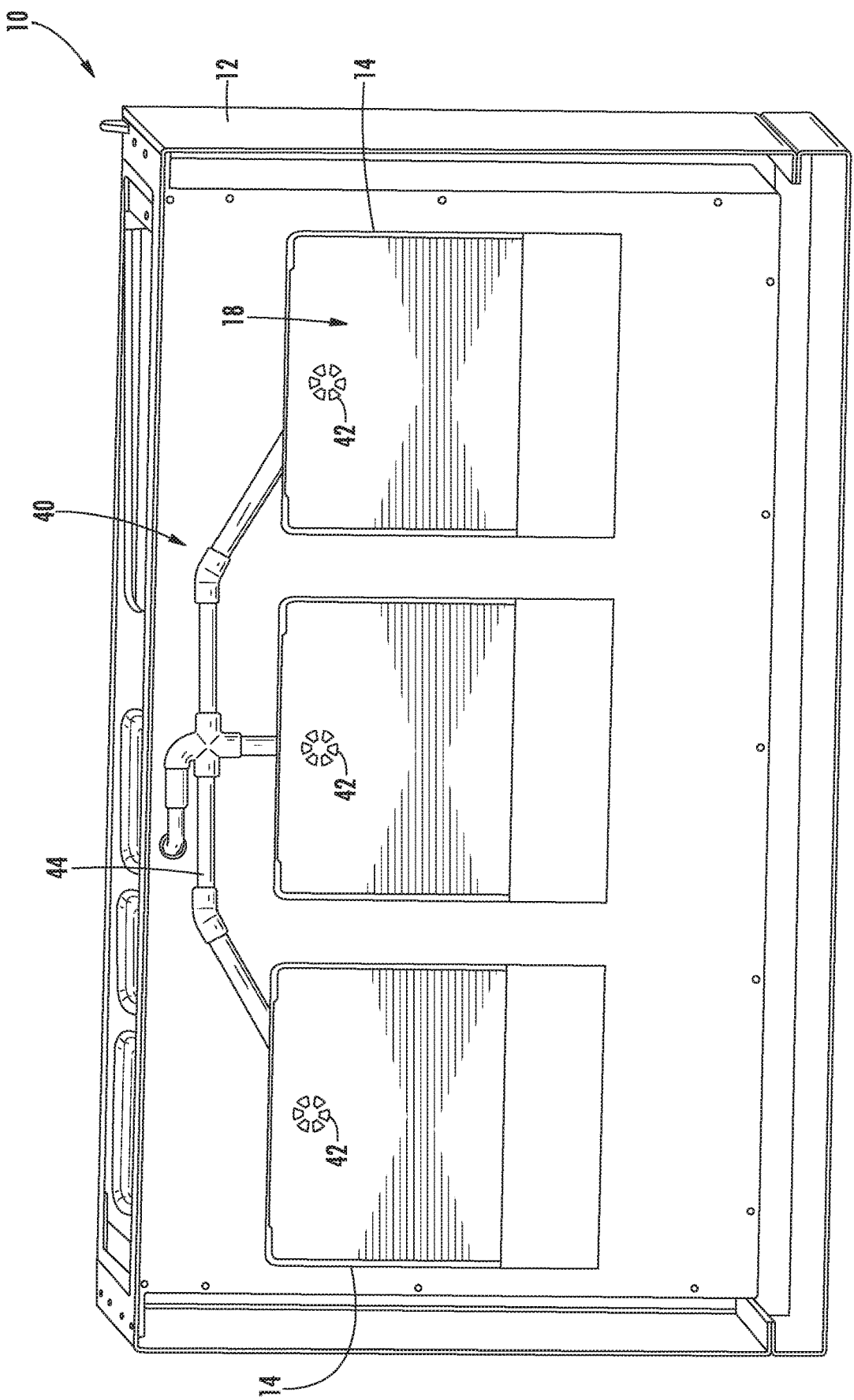
FIG. 4 provides a top view of storage containers positioned within the exemplary temperature controlled delivery box of FIG. 1, with a top panel removed to reveal a drainage system according to an exemplary embodiment of the present subject matter.

Referring now generally to FIGS. 2 through 4, delivery appliance 10 further includes a drainage system 40 for collecting and discharging liquids from within storage containers 14, e.g., such as melted items, condensation, melted frost, etc. Specifically, a drain 42 is defined in a bottom of each storage container 14. Drain 42 may be in fluid communication with one or more drainage pipes 44 for routing liquid out of storage containers 14 under the force of gravity. The drainage pipes 44 may merge and pass all collected liquid through a mechanical compartment 46 (FIG. 2) where it may be discharged from delivery appliance 10 (e.g., to an external drain) or used for other purposes within delivery appliance 10. Although drainage system 40 is illustrated as a gravity operated system, it should be appreciated that a suitable drainage pump may be used according to alternative embodiments.

Figure 5:
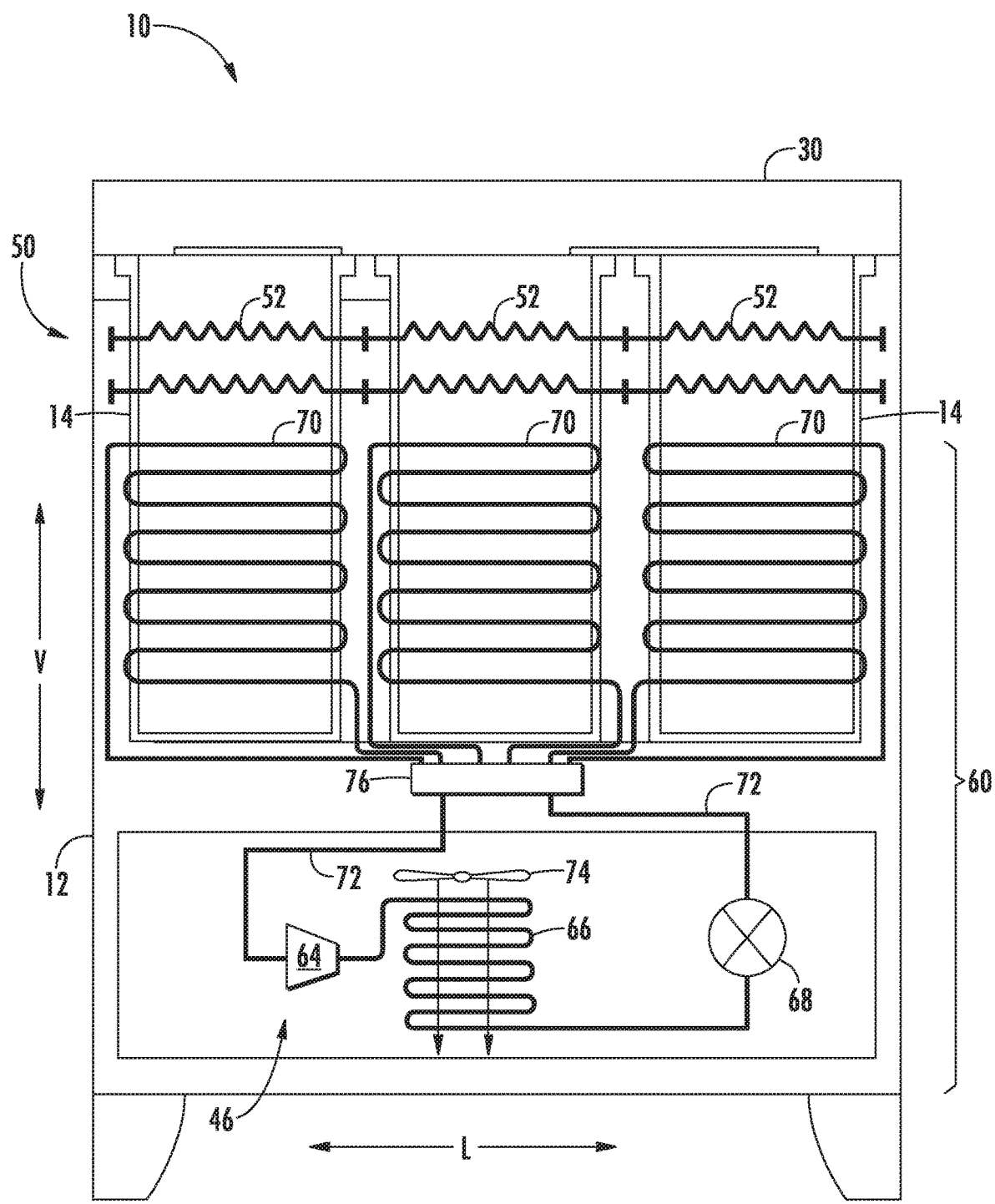
FIG. 5 provides a schematic view of a sealed cooling system configured for cooling the exemplary temperature controlled delivery box of FIG. 1 according to an exemplary embodiment of the present subject matter.

Referring now specifically to FIGS. 2 and 5, mechanical compartment 46 may be defined in a rear wall of cabinet 12 and may be configured for receiving various operating components of delivery appliance 10. For example, delivery appliance 10 may include a climate control system 50 that includes various components for regulating one or more container temperatures, e.g., the temperature measured within respective storage containers 14. Thus, climate control system 50 may generally be in thermal communication with storage containers 14 and some or all components of climate control system 50 may be mounted within mechanical compartment 46.

Referring now specifically to FIG. 5, a schematic view of certain components of temperature controlled delivery appliance 10 and climate control system 50 will be illustrated and described according to an exemplary embodiment. As described below, climate control system 50 may generally include a system or devices for heating storage containers 14 and/or a system or devices for cooling storage containers 14. Although an exemplary climate control system 50 is described below, it should be appreciated that climate control system 50 may include different component, configuration, and subsystems for heating, cooling, humidifying, dehumidifying, or otherwise controlling the climate with each of the respective storage containers 14.

According to exemplary embodiments, it may sometimes be desirable to raise the container temperature within one or more storage containers 14, e.g., when it is very cold outside or if hot food items 20 are being stored. In such cases, delivery appliance 10 may include a heating device 52 in thermal communication with one or more storage containers 14 for regulating the temperature of the storage containers 14. Thus, heating device 52 may be selectively activated and deactivated to control the container temperature. In general, heating device 52 may be any suitable type of heating element, such as an electric resistance heating element. In addition, heating device 52 may be used periodically to melt any frost build-up within storage containers 14.

In addition, it may frequently be desirable to lower the container temperature of one or more storage containers 14, e.g., when is it relatively warm outside or when chilled or perishable food items 20 are stored. In this regard, delivery appliance 10 may include features to operate delivery appliance as a refrigerator and/or freezer appliance. For example, delivery appliance 10 may include a sealed refrigeration system or sealed system 60, which is generally configured for executing a vapor compression cycle for cooling storage containers 14, as explained below.

In this regard, for example, sealed system 60 may include a compressor 64, a condenser 66, an expansion device 68, and one or more evaporators 70 connected in series by fluid conduit 72 that is charged with a refrigerant. As will be understood by those skilled in the art, sealed system 60 may include additional components, e.g., at least one additional evaporator, compressor, expansion device, and/or condenser. As an example, sealed system 60 may include three evaporators wrapped directly around storage containers 14.

Within sealed system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 74 may be used to pull air across condenser 66, as illustrated by arrows in FIG. 5, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device 68 (e.g., a electronic expansion valve, capillary tube, or other restriction device) receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to storage containers 14 of delivery appliance 10. As such, by wrapping evaporators 70 around storage containers 14 or positioning evaporator 70 coils within the walls of the storage containers 14, the temperature within storage containers 14 may be lowered.

Notably, as illustrated in FIG. 5, delivery appliance 10 may include three storage containers 14, each of which may have a dedicated evaporator 70. According to an exemplary embodiment, a single compressor 64, condenser 66, and expansion device 68 may support the operation of such evaporators 70. In this regard, sealed system 60 may include a refrigerant control valve 76 for regulating the flow of refrigerant to evaporators 70 to provide selective and independent cooling of each storage container 14. In this manner, using climate control system 50, each storage container 14 may have a different pre-conditioning temperature or target temperature, as described in more detail below. It should be appreciated that more or fewer storage containers 14 may be used and the configuration of one or more evaporators 70 may vary while remaining within the scope of the present subject matter.

The sealed system 60 depicted in FIG. 5 is provided by way of example only. Thus, it is within the scope of the present subject matter for other configurations of the refrigeration system to be used as well. For example, according to alternative embodiments, cooled air may be passed over evaporator 70 and into storage containers 14 instead of relying on contact cooling. In addition, although sealed system 60 is described above as performing a vapor compression cycle to refrigerate storage containers 14, it should be appreciated that a sealed system may be alternately operated as a heat pump, e.g., and thus perform a heat pump cycle for heating storage containers 14. In this regard, for example, sealed system 60 may include a four-way reversing valve which could also be used to reverse the flow of refrigerant within fluid conduit 72 such that condenser 66 operates as an evaporator, and evaporator 70 operates as a condenser.

In some embodiments, delivery appliance 10 also includes one or more sensors that may be used to facilitate improved operation of delivery appliance 10, such as described below. For example, in order to obtain temperature or humidity data, delivery appliance 10 may include a plurality of temperature sensors and/or humidity sensors. Specifically, as shown in FIG. 3, a container temperature sensor 80 may be positioned within or placed in thermal communication with each storage container 14 for measuring a container temperature therein. For example, according to the illustrated embodiment, container temperature sensors 80 are mounted to a rear wall of each storage container 14. Alternatively, container temperature sensors 80 may be positioned at any other suitable location proximate to storage containers 14 for providing data indicative of the container temperature. In addition, an ambient temperature sensor 82 may be positioned outside cabinet 12 for measuring a temperature of the environment in which delivery device 10 is located.

As used herein, "temperature sensor" or the equivalent is intended to refer to any suitable type of temperature measuring system or device positioned at any suitable location for measuring the desired temperature. Thus, for example, temperature sensors 80, 82 may each be any suitable type of temperature sensor, such as a thermistor, a thermocouple, a resistance temperature detector, etc. In addition, temperature sensors 80, 82 may be positioned at any suitable location and may output a signal, such as a voltage, to a controller that is proportional to and/or indicative of the temperature within storage container 14 or the ambient environment, respectively. Although exemplary positioning of temperature sensors is described herein, it should be appreciated that delivery appliance 10 may include any other suitable number, type, and position of temperature, humidity, and/or other sensors according to alternative embodiments.

Referring again to FIG. 1, delivery appliance 10 may include a control panel 90 including one or more selector inputs 92, such as knobs, buttons, touchscreen interfaces, etc. Additionally, a display 94, such as an indicator light or a screen, may be provided on control panel 90. Control panel 90, selector inputs 92, and display 94 may be in communication with a processing device or controller 96. In this manner, controller 96 may receive control inputs from selector inputs 92, may display information using display 94, and may otherwise regulate operation of the appliance. For example, signals generated in controller 96 may operate delivery appliance 10, including climate control system 50 and other system components, in response to the position of selector inputs 92 and other control commands.

Figure 6:
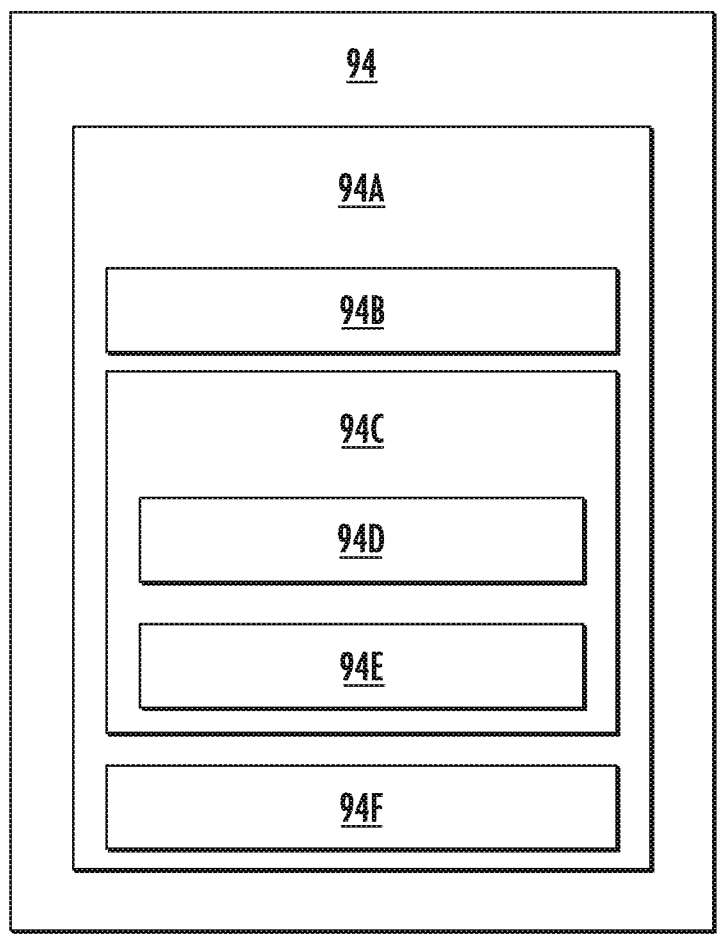
FIG. 6 depicts certain components of a controller according to example embodiments of the present subject matter.

FIG. 6 depicts certain components of controller 96 according to example embodiments of the present disclosure. Controller 96 can include one or more computing device(s) 96A which may be used to implement methods as described herein. Computing device(s) 96A can include one or more processor(s) 96B and one or more memory device(s) 96C. The one or more processor(s) 96B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 96C can include one or more non-transitory computer-readable storage medium(s), such as RAM, ROM, EEPROM, EPROM, flash memory devices, magnetic disks, etc., and/or combinations thereof.

The memory device(s) 96C can include one or more computer-readable media and can store information accessible by the one or more processor(s) 96B, including instructions 96D that can be executed by the one or more processor(s) 96B. For instance, the memory device(s) 96C can store instructions 96D for running one or more software applications, displaying a user interface, receiving user input, processing user input, etc. In some implementations, the instructions 96D can be executed by the one or more processor(s) 96B to cause the one or more processor(s) 96B to perform operations, e.g., such as one or more portions of methods described herein. The instructions 96D can be software written in any suitable programming language or can be implemented in hardware. Additionally, and/or alternatively, the instructions 96D can be executed in logically and/or virtually separate threads on processor(s) 96B.

The one or more memory device(s) 96C can also store data 96E that can be retrieved, manipulated, created, or stored by the one or more processor(s) 96B. The data 96E can include, for instance, data to facilitate performance of methods described herein. The data 96E can be stored in one or more database(s). The one or more database(s) can be connected to controller 96 by a high bandwidth LAN or WAN, or can also be connected to controller through network(s) (such as network 102 described below). The one or more database(s) can be split up so that they are located in multiple locales. In some implementations, the data 96E can be received from another device.

The computing device(s) 96A can also include a communication module or interface 96F used to communicate with one or more other component(s) of controller 96 or delivery appliance 10 over the network(s). The communication interface 96F can include any suitable components for interfacing with one or more network(s), including for example, transmitters, receivers, ports, controllers, antennas, or other suitable components.

As illustrated and described in FIG. 6, controller 96 includes a memory and microprocessor, such as a general or special purpose microprocessor operable to execute programming instructions or micro-control code associated with methods described herein. However, it should be appreciated that according to alternative embodiments, controller 96 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Selector inputs 92, display 94, sensors, and other components of delivery appliance 10 may be in communication with controller 96 via one or more signal lines or shared communication busses.

Referring again to FIG. 1, a schematic diagram of an external communication system 100 will be described according to an exemplary embodiment of the present subject matter. In general, external communication system 100 is configured for permitting a consumer, a grocery delivery service, or another entity to communicate with and/or control delivery appliance 10, e.g., through controller 96. For example, this communication may be used to provide and receive delivery notifications or instructions, as described below. Alternatively, such notifications and information may be input directly through control panel 90.

As illustrated, external communication system 100 permits controller 96 of delivery appliance 10 to communicate with external devices either directly or through a network 102. For example, a consumer may use a consumer device 104 to communicate directly with delivery appliance 10. For example, consumer devices 104 may be in direct or indirect communication with delivery appliance 10, e.g., directly through a local area network (LAN), Wi-Fi, Bluetooth, Zigbee, etc. or indirectly through network 102. In general, consumer device 104 may be any suitable device for providing and/or receiving communications or commands from a user. In this regard, consumer device 104 may include, for example, a personal phone, a tablet, a laptop computer, or another mobile device.

In addition, a remote server 106 may be in communication with delivery appliance 10 and/or consumer device 104 through network 102. In this regard, for example, remote server 106 may facilitate or operate a grocery delivery service. In this regard, remote server 106 may be a cloud-based server 106, and is thus located at a distant location, such as in a separate state, country, etc. In general, communication between the remote server 106 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL).

In general, network 102 can be any type of communication network. For example, network 102 can include one or more of a wireless network, a wired network, a personal area network, a local area network, a wide area network, the internet, a cellular network, etc. According to an exemplary embodiment, consumer device 104 may communicate with a remote server 106 over network 102, such as the internet, to place food orders, process payments, etc. In addition, consumer device 104 and remote server 106 may communicate with delivery appliance 10 to coordinate the delivery and receipt of food items 20, as described in detail below.

External communication system 100 is described herein according to an exemplary embodiment of the present subject matter. However, it should be appreciated that the exemplary functions and configurations of external communication system 100 provided herein are used only as examples to facilitate description of aspects of the present subject matter. System configurations may vary, other communication devices may be used to communicate directly or indirectly with one or more delivery appliances, other communication protocols and steps may be implemented, etc. These variations and modifications are contemplated as within the scope of the present subject matter.

Now that the construction and configuration of delivery appliance 10 and external communication system 100 have been presented according to an exemplary embodiment of the present subject matter, an exemplary method 200 for operating a delivery appliance using an external communication system is provided. Method 200 can be used to operate delivery appliance 10 using external communication system 100, or to operate any other suitable delivery appliance using any other suitable communication system. In this regard, for example, controller 96 may be configured for implementing method 200. However, it should be appreciated that the exemplary method 200 is discussed herein only to describe exemplary aspects of the present subject matter, and is not intended to be limiting.

Figure 7:
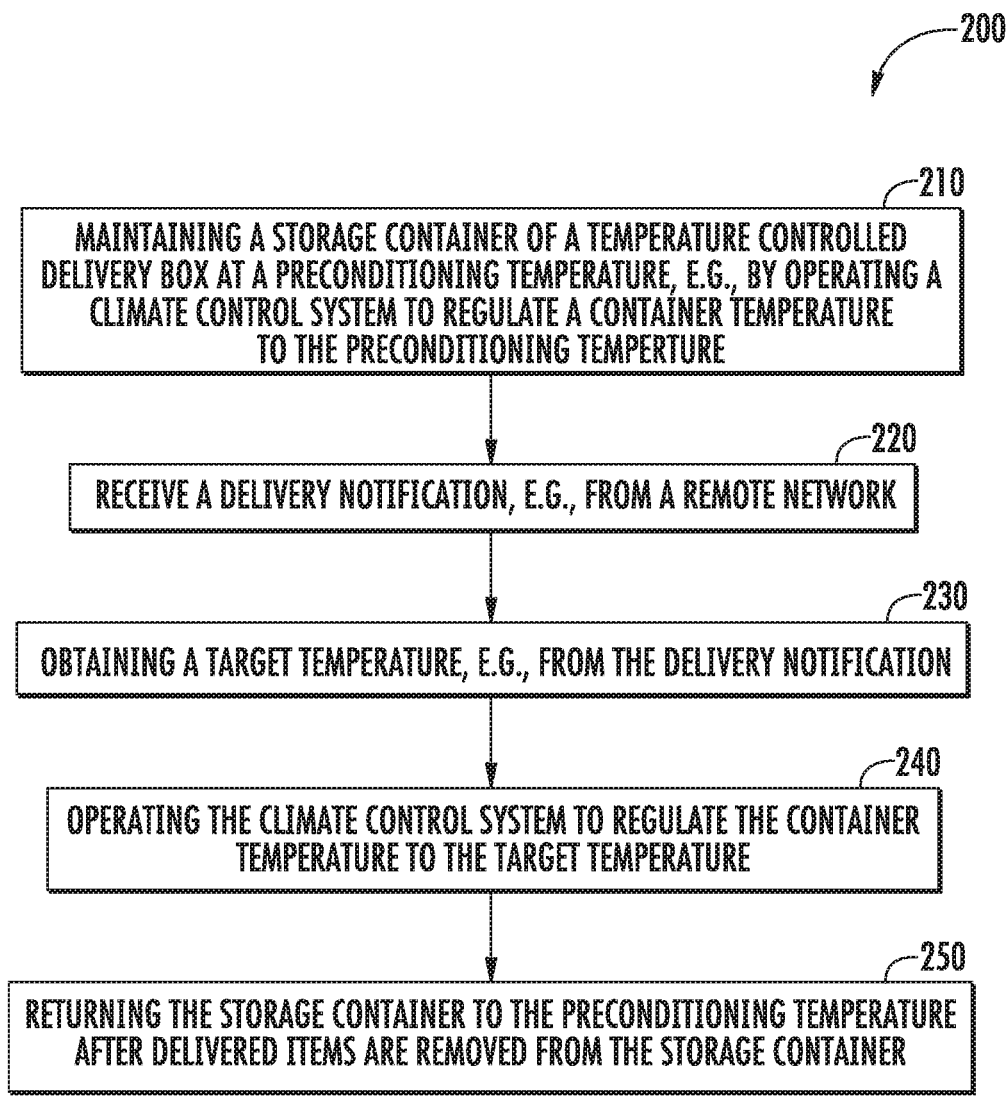
FIG. 7 provides a method for pre-conditioning the temperature controlled delivery box prior to a delivery according to an exemplary embodiment of the present subject matter.

As shown in FIG. 7, method 200 includes, at step 210, maintaining a storage container of a temperature controlled delivery box at a preconditioning temperature. For example, continuing the example from above, controller 96 of delivery box 10 may operate climate control system 50 to regulate a container temperature (e.g., as measured by container temperature sensor 80) to the preconditioning temperature.

As used herein, "preconditioning temperature" is intended to refer to a desired temperature within storage container 14 which is somewhere between the ambient temperature (e.g., as measured by ambient temperature sensor 82) and a target temperature (e.g., the temperature necessary for storage of food items 20). Notably, a user, manufacturer, or delivery service may set the preconditioning temperature as needed to ensure storage container 14 reaches the target temperature prior to or at delivery of food items 20.

Method 200 further includes, at step 220 receiving a delivery notification. For example, continuing the example from above, delivery appliance 10 may receive delivery notification of specific food items 20 from a grocery delivery service through remote network 102. Step 230 includes obtaining a target temperature, which may correspond to the desired temperature or temperatures of storage containers 14 in order to properly store the specific food items 20 that are being delivered. Notably, the delivery notification may further include an approximated delivery time delay (e.g. the time delay between receipt of the delivery notification and the delivery of food items 20), a target temperature for those food items 20, and any other suitable information. Alternatively, the target temperature may be preset by the manufacturer or user of delivery appliance 10.

Figure 8:
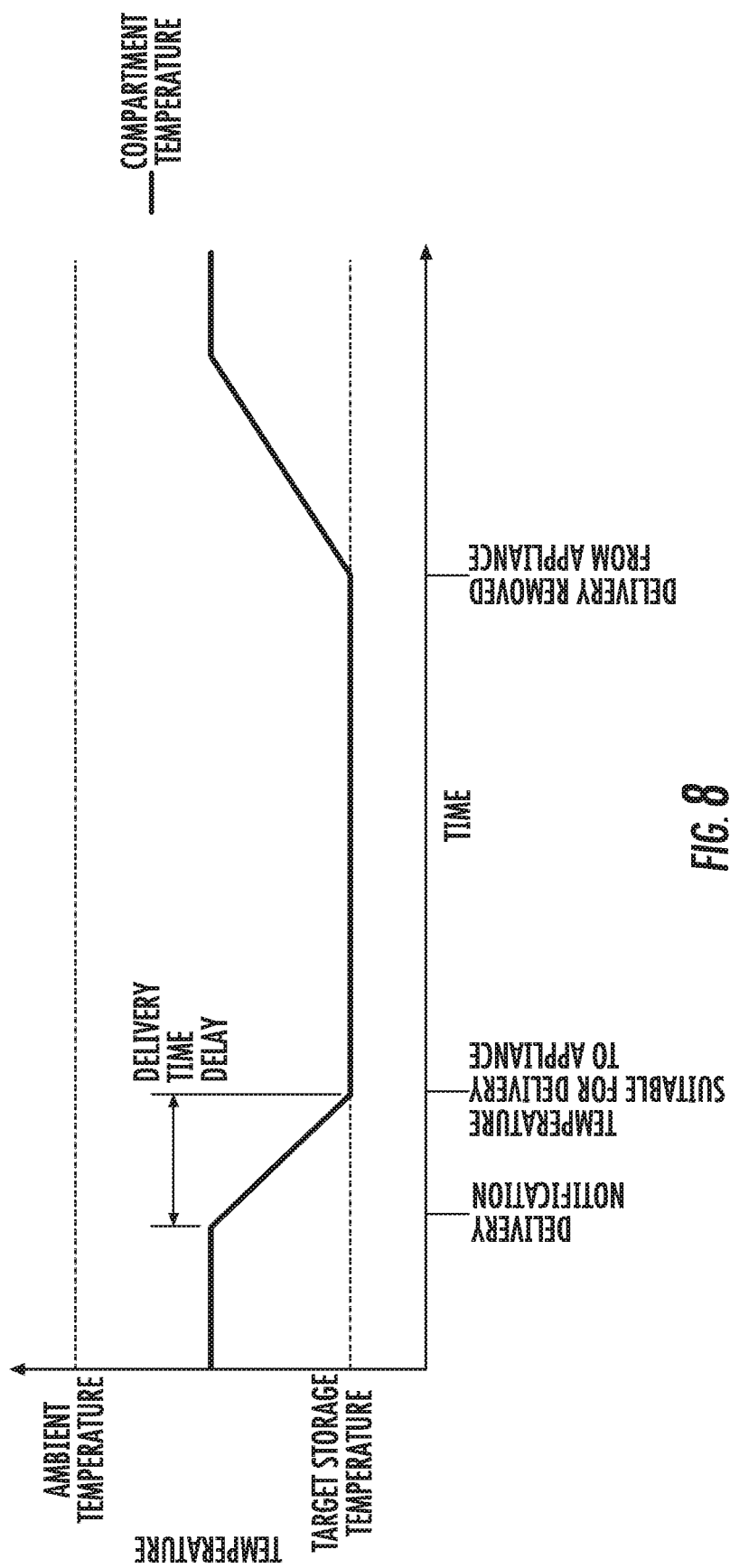
FIG. 8 provides an exemplary temperature profile of the exemplary temperature controlled delivery box of FIG. 1 according to an exemplary embodiment of the present subject matter.

Step 240 includes operating the climate control system to regulate the container temperature to the target temperature. In this regard, for example, the container temperature may be measured using container temperature sensor 80 and may be fed back continuously to controller 96. Controller 96 may then operate climate control system 50 to regulate the container temperature. More specifically, according to an exemplary embodiment, sealed system 60 may generally be used for lowering the temperature of storage containers 14 and heating device 52 may be generally used for raising the temperature of storage containers 14. In addition, step 250 may include returning the storage container to the preconditioning temperature after delivered food items 20 are removed from the storage container, e.g., to conserve energy. An exemplary temperature profile achieved within storage container 14 when using method 200 is provided for example in FIG. 8.

In general, the preconditioning temperature is selected to achieve a balance between reduced energy consumption and ensuring the target temperature may be achieved when a food delivery is expected. For example, according to an exemplary embodiment, the preconditioning temperature is a temperature about half way between an ambient temperature and the target temperature. In this regard, if the ambient temperature is 77° F. and the target temperature is a common refrigerator temperature (e.g., 37° F.), the preconditioning temperature may split the difference at 57° F. In this manner, energy usage is reduced by not maintaining storage container 14 at 37° F. constantly, while it is still possible for storage container 14 to reach the target temperature before a delivery of food items 20 arrives.

According to another embodiment, the preconditioning temperature may be determined or calculated as a function of a regulation capacity of the climate control system, the target temperature, and an estimated delivery delay time. The regulation capacity of the climate control system, for example, is the rate at which climate control system 50 may lower or raise the temperature within the storage container 14 (e.g., in degrees per minute). In addition, the estimated delivery delay time may be an approximate time that elapses between when the delivery notification is received and when food items 20 are delivered.

For example, the delivery delay time may be provided by the grocer when the delivery notification is transmitted, may be an estimated time based on historical delivery data, or may be determined in any other suitable manner. Thus, for example, if the target temperature is 37° F., the climate control system has a regulation capacity of 1° per minute, and the delivery delay time is approximately 30 minutes, the preconditioning temperature can be calculated as 67° F. By contrast, under the same scenario, if the regulation capacity of the climate control system were 0.5° per minute, the preconditioning temperature would be 52° F.

FIG. 7 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using delivery appliance 10 and external communication system 100 as an example, it should be appreciated that these methods may be applied to the operation of any suitable appliance and payment management system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of pre-conditioning a temperature controlled delivery appliance, the temperature controlled delivery appliance comprising a storage container and a climate control system, the method comprising:
    obtaining a first target temperature;
    operating the climate control system to maintain the storage container at the first target temperature defining a preconditioning temperature;
    receiving a delivery notification;
    obtaining a second target temperature;
    operating the climate control system to regulate the storage container to the second target temperature defining a storage temperature for a delivered item; and
    wherein the first target temperature is about halfway between an ambient temperature and the second target temperature, or wherein the first target temperature is determined as a function of a regulation capacity of the climate control system, the second target temperature, and an estimated delivery delay time.

2. The method of claim 1, wherein maintaining the storage container at the first target temperature comprises:
   obtaining the container temperature using a temperature sensor positioned within the storage container; and
   operating the climate control system to regulate the container temperature to be substantially equivalent to the first target temperature.

3. The method of claim 1, further comprising:
   returning the storage container to the first target temperature after the delivered item is removed from the storage container.

4. The method of claim 1, wherein the temperature controlled delivery appliance is in operative communication with a remote network, and wherein the delivery notification is transmitted through the remote network.

5. The method of claim 4, wherein the remote network comprises a wireless network.

6. The method of claim 1, wherein the climate control system comprises a heating device in thermal communication with the storage container, and wherein operating the climate control system to regulate the container temperature to the second target temperature comprises:
   heating the storage container using the heating device if the second target temperature is greater than the container temperature.

7. The method of claim 1, wherein the climate control system comprises:
   a sealed system comprising a condenser and an evaporator; and
   a compressor operably coupled to the sealed system and being configured for urging a flow of refrigerant through the condenser and the evaporator.

8. The method of claim 1, wherein the temperature controlled delivery appliance comprises a plurality of storage containers positioned within a cabinet, and wherein each of the plurality of storage containers may have a different first target temperature and a different second target temperature.

9. The method of claim 8, wherein the climate control system comprises a plurality of evaporators, each of the plurality of evaporators being thermally coupled to one of the plurality of storage containers, the method further comprising:
   regulating the flow of refrigerant between the plurality of evaporators using a refrigerant control valve.

10. The method of claim 1, wherein the second target temperature is provided with the delivery notification.

\* \* \* \* \*